United States Patent [19]
Omori
[11] Patent Number: 4,649,620
[45] Date of Patent: Mar. 17, 1987

[54] METHOD OF MAKING A SOCKET-TYPE KEY FOR AN A ANTI-THEFT LUG NUT HAVING A SURFACE KEY PATTERN

[76] Inventor: Shigeru Omori, Unagidani Mishinomachi, Minamiku, Osaka, Japan

[21] Appl. No.: 767,497

[22] Filed: Aug. 20, 1985

[51] Int. Cl.$^4$ ........................ B21D 39/00; B23P 11/00

[52] U.S. Cl. ........................................ 29/511; 29/520; 81/451; 411/403; 411/429; 411/910

[58] Field of Search ......................... 29/520, 509, 511; 81/451; 411/403, 429, 910

[56] References Cited

U.S. PATENT DOCUMENTS

| | | | |
|---|---|---|---|
| 1,009,248 | 11/1911 | Jenkins et al. | 81/451 X |
| 2,509,006 | 5/1950 | Lynn | 29/520 UX |
| 2,660,080 | 11/1953 | De Kam | 81/451 |
| 2,782,822 | 2/1957 | Clark | 81/451 |
| 3,025,734 | 3/1962 | Ash | 81/451 |
| 3,483,612 | 12/1969 | Rogge | 29/520 |
| 3,707,894 | 1/1973 | Stillwagon, Jr. | 81/451 X |
| 3,884,282 | 5/1975 | Dobrosielski | 81/451 X |
| 4,242,932 | 1/1981 | Barmore | 411/410 X |
| 4,474,562 | 10/1984 | Heurich | 29/520 X |
| 4,480,513 | 11/1984 | McCauley | 411/403 X |

FOREIGN PATENT DOCUMENTS

| | | | |
|---|---|---|---|
| 1079577 | 4/1960 | Fed. Rep. of Germany | 29/520 |

*Primary Examiner*—Charlie T. Moon
*Attorney, Agent, or Firm*—I. Morley Drucker

[57] ABSTRACT

The disclosure is directed to the method of addition, in a fixed and inexpensive way, of a cylindrical sleeve to a key for an anti-theft wheel lug nut having a complementary key pattern formed on a surface thereof, and to the resulting key. The cylindrical sleeve of the key is formed separately from the key and then rigidly attached onto a groove formed in the key itself. The sleeve acts as a guide for the key and prevents the dismounting thereof during the torquing and untorquing of the complementary patterned lug nut.

1 Claim, 3 Drawing Figures

Fig. A
(PRIOR ART)

METHOD OF MAKING A SOCKET-TYPE KEY FOR AN A ANTI-THEFT LUG NUT HAVING A SURFACE KEY PATTERN

FIELD OF THE INVENTION

This invention concerns a specialized key for an anti-theft vehicle wheel lug nut having a complementary key pattern on the surface thereof, and the method of forming the specialized key.

PRIOR ART

Various specialized keys for anti-theft vehicle wheel lug nuts (having a key pattern on its surface) are known, including one type in which the key has an extending cylindrical sleeve thereover, as shown in FIG. A (Prior Art). In FIG. A, the key 100 comprises a hexagonally shaped rear end 102, to which is integrally affixed the key 104 and the cylindrical sleeve 106, which is also integrally formed therearound. The key 100 is formed as a one-piece construction and requires costly and sophisticated tooling because of the intricacy of the design. Also, numerous molds must be made because of the number of key patterns normally required in order to achieve an effective anti-theft deterrent. Also, keys are usually made with and without the cylindrical sleeve, and inventory, sufficient to cover both types of devices, must be kept—resulting in very high inventory costs.

The main objects of the invention are to substantially reduce such inventory costs and to also materially reduce tooling costs. Other advantages of the invention will become apparent from the following description.

SUMMARY OF THE INVENTION

The invention comprises a two-piece key for an anti-theft wheel lug nut having a complementary key pattern formed on a surface thereof. The two-piece key comprises: (1) a conventional key itself, and (2) affixed to the conventional key, a separately formed cylindrical sleeve. The conventional key has a hexagonal rear peripheral end surface, for torquing and untorquing, and a frontal key pattern. Surrounding the key pattern is a cylindrical sleeve. The cylindrical sleeve is affixed to the key by preferably first forming a circular groove in the key itself, and then rigidly affixing the sleeve to the key by a single flaring tool.

The resulting two-piece key, sometimes termed here and in the claims as a socket-type key, acts as a guide for the key, and prevents the dismounting thereof during the torquing and untorquing of the complementary patterned lug nut.

BRIEF DESCRIPTION OF THE DRAWINGS

FIG. A is a perspective view of a one-piece stamped-out socket-type key of the prior art.

DETAILED DESCRIPTION OF THE INVENTION

Figure 1:
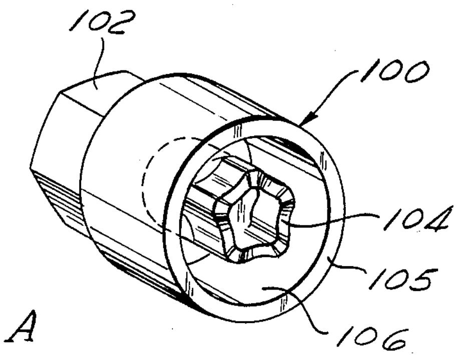
FIG. 1 is a perspective view of a two-piece socket-type key of this invention.
Figure 1:
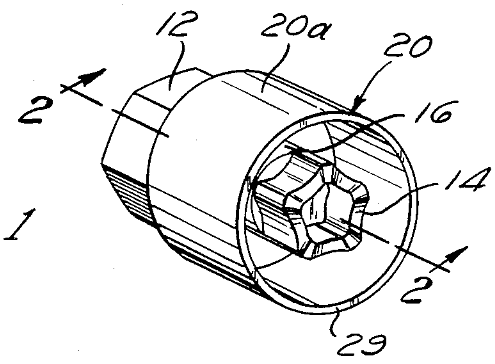
Figure 2:
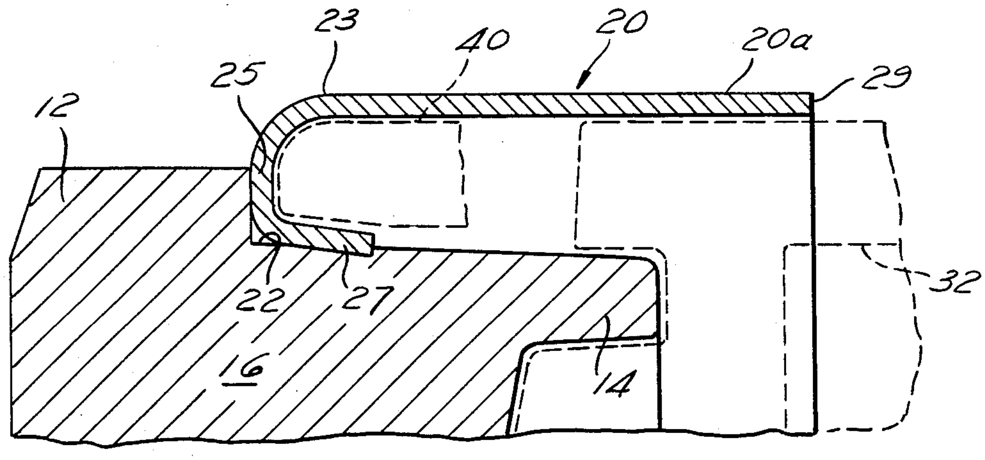
FIG. 2 is a fragmentary cross-section of FIG. 1 taken along the line 2—2, taken together with a partial, side elevational view of a typical, prior art, anti-theft vehicle wheel lug nut, shown in phantom line.

Referring to FIGS. 1–2, a conventional key 10, for an anti-theft vehicle wheel lug nut having a complementary key pattern, is shown. The key 10 is formed of metal or metal alloy and has a rear torquing surface 12, preferably hexagonal in shape. The key 10 is also provided with a frontally exposed key pattern 14. The key pattern 14 extends forwardly from a cylindrical shoulder 16 formed intermediate the torquing section 12 and the key pattern section 14. The key 10, as described to this point, is conventional in construction, and may be used to unlock anti-theft vehicle wheel lug nuts having a complementary key pattern on an end surface of such lug nuts.

However, according to this invention, the identical key, as just described, also has rigidly, or fixedly, mounted thereon a stamped-out metal or metal alloy cylindrical sleeve or socket 20. In order to fixedly mount the socket 20, a slight peripheral groove 22 is preferably formed in the intermediate shoulder portion 16 of the key 10 by conventional means, such as a machining operation. The major portion 20*a* of the sleeve 20 has a maximum diameter greater than the diameter of the shoulder portion 16 of the key—so that portion 20*a* overlaps a vehicle wheel lug nut 30, shown in phantom line in FIG. 2, to provide the requisite guiding function of the socket 20. The threaded base of the lug nut 30 is shown by phantom line 32.

Socket 20 is essentially cylindrical in shape, as seen in FIGS. 1 and 2, but its rearward end 23 is bent inwardly, at generally right angles to major sleeve portion 20*a*, as shown at rear section 25.

Rear section 25 is, preferably, also provided with a cylindrical flange portion 27, extending forwardly from the rear end of section 25, a short distance from, and running parallel to, major section 20*a* of sleeve 20. Flange portion 27 is complementary in shape to peripheral groove 22, and by means of a conventional flared tool 40 (shown in phantom in FIG. 2), flange portion 27 is flared outwardly (with respect to sleeve portion 20*a*) into groove 22. Sleeve 20 is thus fixedly mounted to the shoulder area 16 of key 10. Sleeve 20 may also be fixedly mounted to key 10 by other means, as well, such as by welding, brazing, etc.

Insofar as this invention is concerned, it is important to note that the cylindrical sleeve 20 may be formed by a simple stamping operation, and is a completely separate component from that of the key 10. The sleeve wall 29 may be made much thinner than the wall 105 of sleeve 106 of the prior art (FIG. A), thereby saving material. Additionally, and more importantly, the sophisticated and. expensive tooling required to make a one-piece socket-type key 100 of the prior art is avoided, as is the necessity of keeping an inventory of socket-type keys on hand, as well as conventional keys. Conventional keys may be made in any number and then converted, as needed, to the socket-type by means of this invention.

Modifications of this invention will occur to those skilled in the art; hence, I intend to be bound only by the claims which follow.

I claim:

1. In a method of forming a socket-type key for anti-theft vehicle wheel lug nuts, in which a key is first provided witha rearward torquing surface and a key pattern on a forward surface thereof, the improvement which comprises:

fixedly mounting a generally cylindrical sleeve having an inwardly extending radial flange, said radial flange having an annular end portion extending concentrically within said sleeve, to said key forwardly of said torquing surface, and also extending forwardly of and radially outwardly spaced from said key pattern, by forming an annular locking groove in the periphery of said key adjacent a radially outwardly extending shoulder thereon intermediate said torquing surface and said key pattern, and fixedly mounting in said groove said flange annular end portion of said cylindrical sleeve by abutting said radial flange against said radial shoulder, and inwardly deforming said flange annular end portion into said peripheral locking groove.

* * * * *